(12) United States Patent
Lai

(10) Patent No.: US 6,594,715 B1
(45) Date of Patent: Jul. 15, 2003

(54) METHOD AND APPARATUS FOR INTERFACING ASYMMETRIC DIGITAL SUBSCRIBER LINES TO A CODEC

(75) Inventor: Yhean-Sen Lai, Warren, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/433,197

(22) Filed: Nov. 3, 1999

(51) Int. Cl.⁷ .................................................. G06F 3/02
(52) U.S. Cl. .......................... 710/52; 712/225; 455/462
(58) Field of Search ........................... 710/1, 7, 20, 29, 710/30, 31, 52, 53, 58, 61, 8, 12, 35, 36; 713/400; 455/462, 557; 712/225; 709/201

(56) References Cited

U.S. PATENT DOCUMENTS

| | | | | |
|---|---|---|---|---|
| 5,748,627 A | * | 5/1998 | Weir | 370/384 |
| 5,749,064 A | * | 5/1998 | Pawate et al. | 704/213 |
| 5,835,787 A | * | 11/1998 | Raffman et al. | 710/21 |
| 5,881,178 A | * | 3/1999 | Tsykalov et al. | 382/260 |
| 5,889,480 A | * | 3/1999 | Kim | 341/50 |
| 5,978,688 A | * | 11/1999 | Mullins et al. | 455/557 |
| 6,327,476 B1 | * | 12/2001 | Koscal | 455/462 |

* cited by examiner

Primary Examiner—Jeffrey Gaffin
Assistant Examiner—Rijue Mai

(57) ABSTRACT

A method and apparatus for interfacing ADSL modems to a codec, wherein a total of four frame buffers are used for receiving and transmitting data from and to the codec. The present invention also enables interoperability between ADSL modems that use 128 tones and those that use 256 tones.

23 Claims, 3 Drawing Sheets

40

METHOD AND APPARATUS FOR INTERFACING ASYMMETRIC DIGITAL SUBSCRIBER LINES TO A CODEC

FIELD OF THE INVENTION

This invention relates to asymmetric digital subscriber lines (ADSL), and more particularly to a method and apparatus for interfacing ADSL modems to a codec.

BACKGROUND OF THE INVENTION

ADSL modems are used to achieve a very high speed of data communication. They employ discrete niultitone (DMT) technology to communicate large amounts of data, such as are required for transmitting digital television broadcast, on-demand video, teleconferencing and home shopping applications over conventional twisted paired telephone lines. Unlike traditional data modems, ADSL modems require a corresponding modem to be placed in an access module of a telephone company's central office (CO ADSL).

The splitterless ADSL transceiver described in ITU-T Draft G.992.2 (G.992.2) is an interoperable ADSL modem (G.992.2 ADSL modem). Such modems are designed based on certain modifications that reduce the standard functions of heavy ADSL modems designed according to T1.413 Issue 2 specifications. In particular, the frame size of each symbol is reduced from 512 samples or 544 samples with cyclic prefix to 256 samples or 272 samples with cyclic prefix. Further, one hundred twenty eight (128) tones are used instead of two hundred fifty-six (256), and the receiving and transmitting sampling rates are 1.104 MHz instead of 2.208 MHz.

FIG. 1 shows a conventional interface 10 for a G.992.2 modem and a codec 11. The interface uses a total of five frame buffers, two frame buffers 12 and 13 for transmitting data to codec 11 and three frame buffers 14, 15 and 16 for receiving data from codec 11. Specifically, separate frame buffers are used for transmitting circuitry 17 and receiving circuitry 18.

Conventional interfaces of the type shown in FIG. 1 suffer from several significant drawbacks. Specifically, they require a large number of buffers for interfacing with a codec. For 272 samples with cyclic prefix, a conventional G.992.2 ADSL modem uses 1360 words of data memory to interface with a codec. In addition, such conventional interfaces are not easily interoperable with heavy ADSL modems. Finally, they are not easily extendable to implement a heavy ADSL modem because of the additional memory required which adds to the complexity and cost of the device.

SUMMARY

A method and apparatus for interfacing ADSL modems to a codec, wherein a total of four frame buffers are used for transmitting data to and receiving data from the codec. This invention also enables interoperability between ADSL modems that use 128 tones and such modems that use 256 tones.

DETAILED DESCRIPTION OF THE INVENTION

Figure 1:
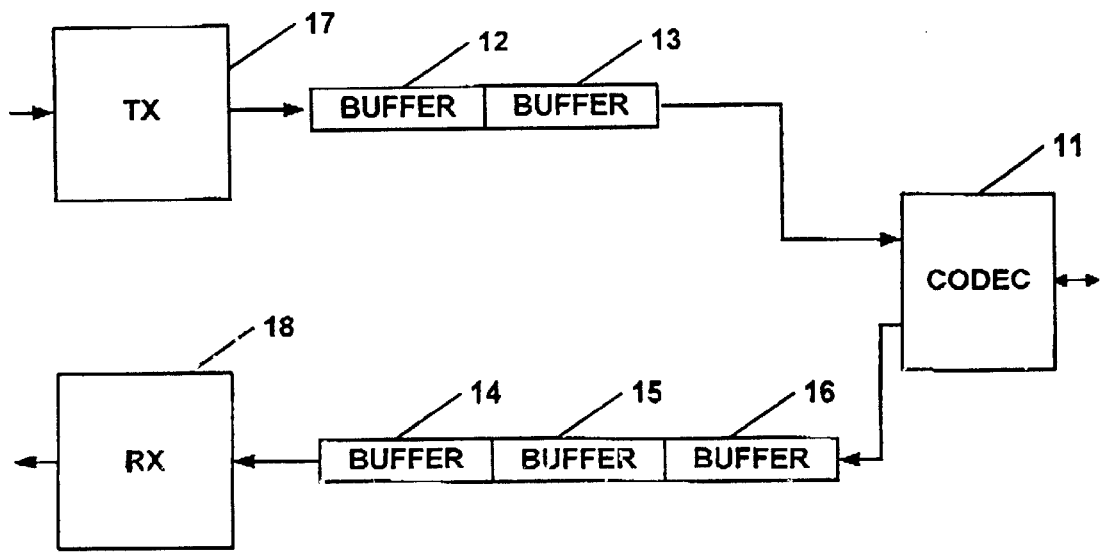
FIG. 1 shows a block diagram of a conventional interface for an ADSL modem designed according to ITU-T Draft G.992.2 specifications and a codec.
Figure 2:
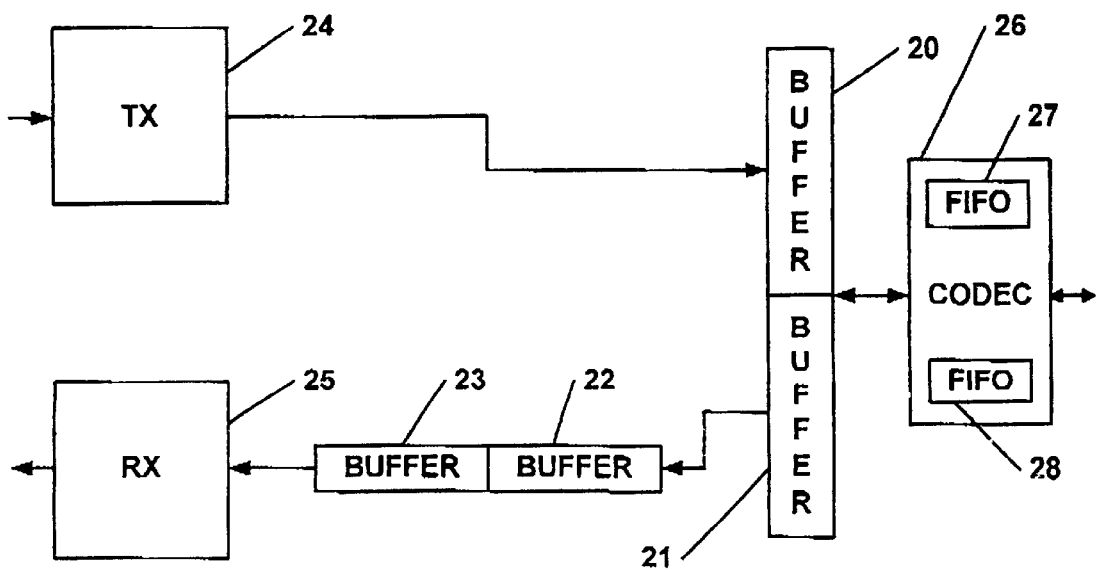
FIG. 2 shows a first exemplary embodiment of an asymmetric digital subscriber line interface according to the present invention.

FIG. 2 shows a first exemplary embodiment of an asymmetric digital subscriber line interface 19 according to the present invention. Two pairs of buffers 20 and 21, and 22 and 23 are used to implement interface 19. The first pair of frame buffers 20 and 21 is coupled to a transmitting circuit 24 and to a receiving circuit 25 via the second pair of frame buffers 22 and 23. The size of the four frame buffers is 256 samples or 272 samples with cyclic prefix. A codec 26 comprises an input fifo 27 and an output fifo 28.

Interface 19 combines and reduces the five frame buffers used in a conventional G.992.2 ADSL into four frame buffers, thereby saving data memory for up to 272 words. In addition, interface 19 reduces the instructions required to read and write one sample from and to a codec, respectively, into the following three step process:

(1) retrieve an input sample from output fifo 28 of codec 26;
(2) swap the input and output samples;
(3) write the output sample into input fifo 27 of codec 26.

Figure 3:
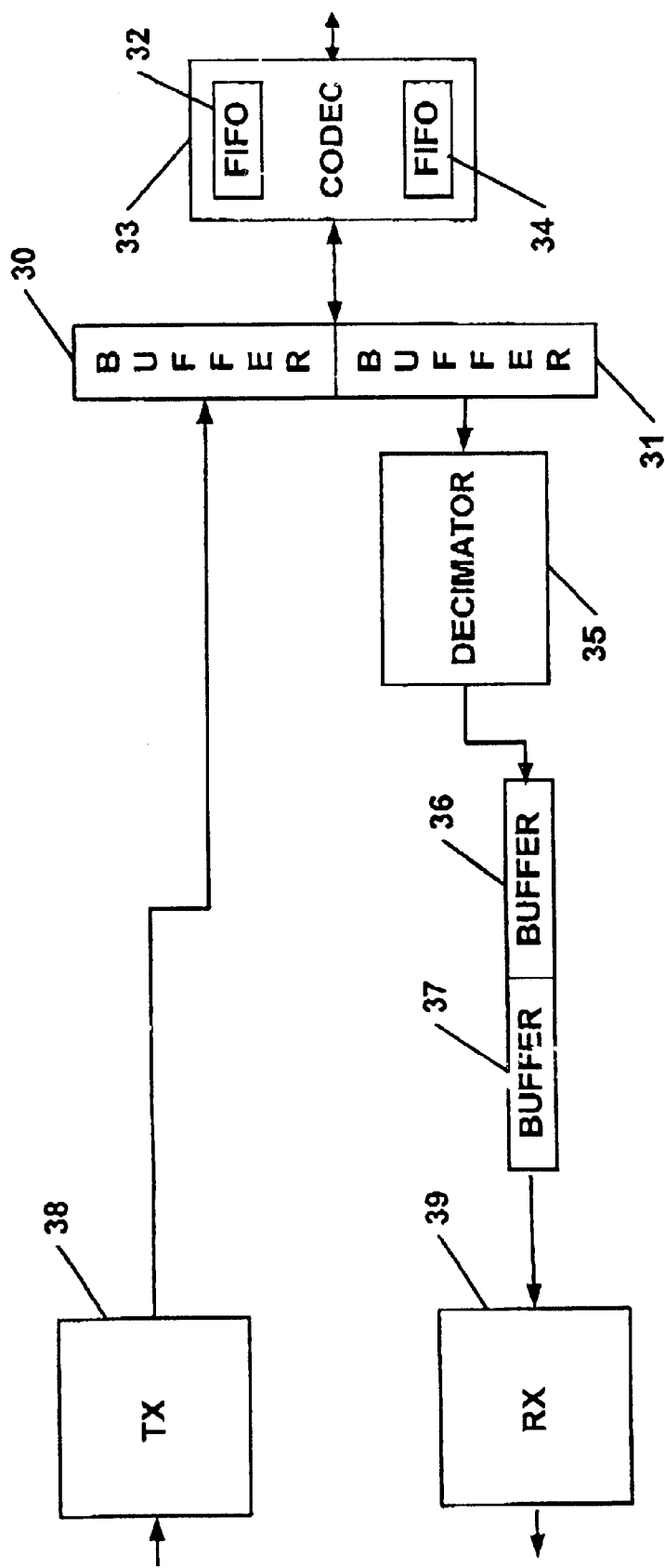
FIG. 3 shows a second exemplary embodiment of an asymmetric digital subscriber line interface according to the present invention.

FIG. 3 shows a second exemplary embodiment of an asymmetric digital subscriber line interface 29 according to the present invention. This embodiment enables interoperability between G.992.2 and heavy ADSL modems. Specifically, the receiver clock rate is increased by two, then a two-to-one decimation is used to slow the clock rate to 1.104 MHz. The receiving circuitry does not use the tones above 128. The transmitter clock rate remains same. Accordingly, downstream and upstream bit rates are the same as those of the conventional G.992.2 modems.

In FIG. 3, a first pair of frame buffers 30 and 31 is used to transmit output samples to an input fifo 32 of a codec 33 and to receive input samples from an output fifo 34 of codec 33. Samples received using frame buffers 30 and 31 are then decimated two to one by a decimator 35. The output from decimator 35 is then coupled to a second pair of frame buffers 36 and 37. A transmitting circuit 38 is coupled to the first pair of frame buffers 30 and 31 and a receiving circuit 39 is coupled to the second pair of frame buffers 36 and 37. The size of the first pair of frame buffers 30 and 31 is 512 samples or 544 samples with cyclic prefix. The size of the second pair of frame buffers 36 and 37 is 256 samples or 272 samples with cyclic prefix.

In addition to enabling interoperability between G.992.2 and heavy ADSL modems, interface 29 simplifies the steps for transmitting one sample and receiving two samples into the following five step process:

(1) retrieve an input sample from output fifo 34 of codec 33;
(2) swap the input and output samples;
(3) write the output sample into input fifo 32 of codec 33;
(4) retrieve a second input sample from output fifo 34 of codec 33;
(5) store the two input samples and skip the second output sample.

The decimation function required in interface 29 can operate in either the interrupt or background service.

Figure 4:
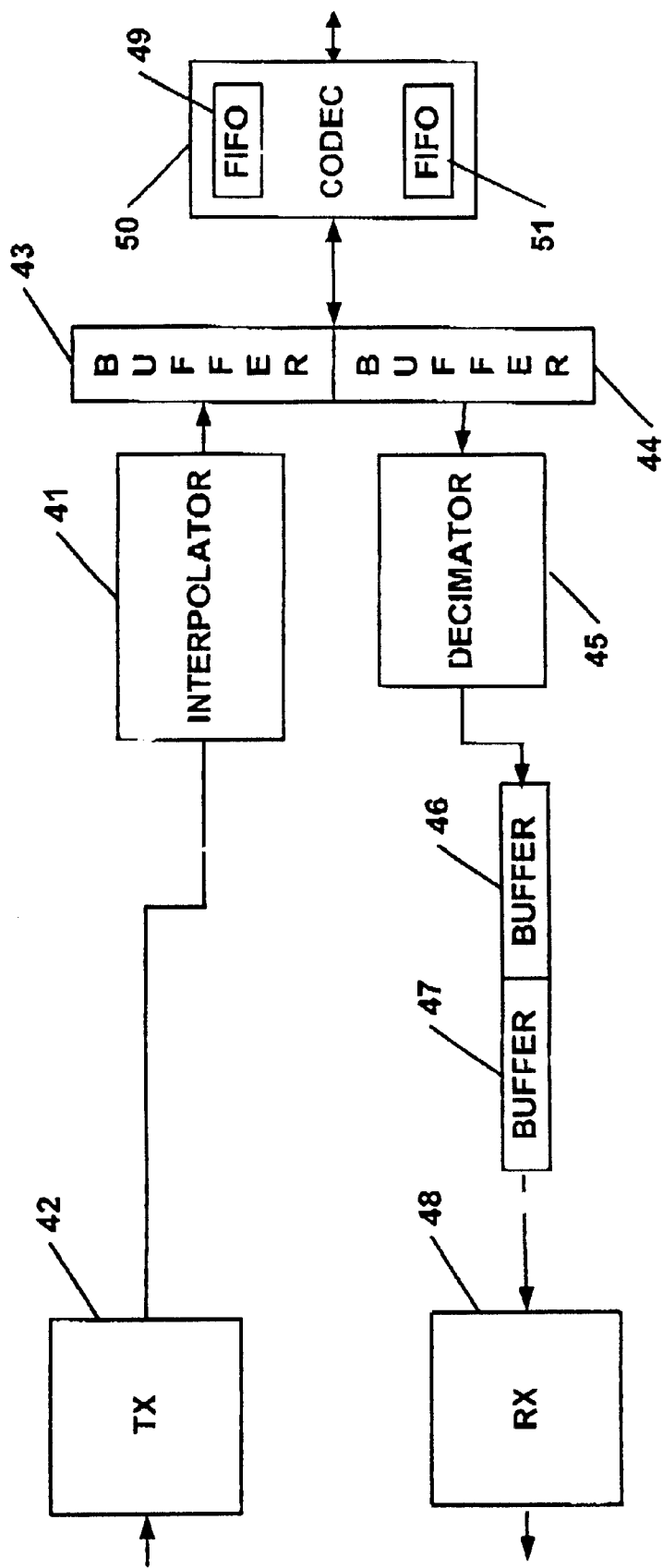
FIG. 4 shows a third exemplary embodiment of an asymmetric digital subscriber line interface according to the present invention.

FIG. 4 shows a third illustrative embodiment of an asymmetric digital subscriber line interface 40 according to the present invention which enables interoperability between G.992.2 and heavy ADSL modems. In interface 40, both the transmitting and receiving clock rates are increased by two to 2.208 MHz. On the transmitting side, a one-to-two interpolator 41 is coupled between a transmitting circuit 42 and a first pair of frame buffers 43 and 44. Thus, the upstream bit rate of a conventional G.992.2 ADSL modem is maintained. On the receiving side, a two-to-one decimator 45 is coupled between the first pair of frame buffers 43 and 44 and a second pair of frame buffers 46 and 47. A receiving circuit 48 is coupled to the second pair of frame buffers 46 and 47. Thus, the downstream bit rate of a conventional G.992.2 modem is also maintained. The size of the first pair of frame buffers 43 and 44 is 512 samples or 544 samples with cyclic prefix. The size of the second pair of frame buffers 46 and 47 is 256 samples or 272 samples with cyclic prefix. Tones above 128 are not used. The routine for transmitting a sample to an input fifo 49 of a codec 50 and receiving a sample from an output fifo 51 of codec 50 uses the same three step procedure described above for interface 19.

Any of the embodiments of the present invention can be easily extended to implement a heavy ADSL modem's interface to a codec. For example, an interface for a heavy ADSL modem can be obtained from interface 40 by removing the one-to-two interpolator 41 and the two-to-one decimator 45. Then, the size of the second pair of frame buffers 46 and 47 is changed to 512 samples or 544 samples with cyclic prefix. Finally, the interpolator in the transmitting circuitry 42 that normally interpolates one-to-four is changed to interpolate one-to-eight. The transmitting and receiving clock rates for this interface for a heavy ADSL modem are 2.208 MHz.

The frame size of each symbol is 512 samples or 544 samples with cyclic prefix for heavy ADSL modems and 256 samples or 272 samples with the cyclic prefix for G.992.2 ADSL modems. In brief, a cyclic prefix of 32 or 16 samples is added for a heavy ADSL modem and a G.992.2 ADSL modem, respectively.

In the present invention, the cyclic prefix, either 32 or 16, is inserted during the initialization sequence. The size of the first pair of frame buffers, e.g., buffers 20 and 21 in FIG. 2, is changed during the initialization.

For a client ADSL, the cyclic prefix in input samples is removed in the second pair of frame buffers, e.g., buffers 22 and 23 in FIG. 2, before a cyclic prefix is inserted in output samples. For a CO ADSL, the cyclic prefix in input samples is removed in the second pair of frame buffers after a cyclic prefix is inserted in output samples. Except for this difference relating to the relative timing between the removal and insertion of the cyclic prefix, both client and CO ADSL modems fabricated according to the present invention use the following three step initialization process.

(1) Select whether the two frame buffers for transmitting and receiving samples will use either 256 or 512 samples.

(2) Change the size of the two frame buffers for transmitting and receiving samples to 272 or 544 samples while the cyclic prefix is being inserted in output samples.

(3) Keep the size of the two frame buffers for transmitting and receiving samples constant during the steady state mode.

This three step process can also be used by a codec having transceivers with buffers in its digital interface. For such codecs, each interrupt processes multiple samples instead of one sample.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the embodiment may be varied without departing from the spirit of the invention, and the exclusive use of all modifications which come within the scope of the appended claims is reserved.

What is claimed is:

1. A method for achieving high speed data communication over a twisted paired telephone line, comprising the steps of:
    employing a first pair of frame buffers to receive an input sample from a codec and to transmit an output sample to the codec;
    retrieving the input sample from the codec;
    swapping the input sample and the output sample; and
    writing the output sample to the codec.

2. The method according to claim 1, wherein the receiving means comprises a second pair of frame buffers for storing the input sample received by the first pair of frame buffers.

3. The method according to claim 2, wherein the size of the first and second pairs of frame buffers is 256 or 272 words.

4. The method according to claim 2, wherein the input sample received by the first pair of frame buffers are decimated two to one and are then stored in the second pair of frame buffers.

5. The method according to claim 4, wherein the rate of receiving the input sample is twice the rate of transmitting output samples.

6. The method according to claim 5, wherein the size of the first pair of frame buffers is 512 or 544 words, and the size of the second pair of frame buffers is 256 or 272 words, respectively.

7. The method according to claim 4, wherein the output samples are interpolated one to two immediately before being placed in the first pair of frame buffers.

8. The method according to claim 7, wherein the input and output samples are received and transmitted at 2.208 MHz.

9. The method according to claim 8, wherein the size of the first pair of frame buffers is 512 or 544 and the second pair of frame buffers is 256 or 272 words, respectively.

10. The method claim according to claim 2, wherein the size of the first and second pairs of frame buffers is 512 or 544 words.

11. The method according to claim 10, wherein the rate of receiving input samples is 2.208 MHz.

12. An apparatus for achieving high speed data communication over a twisted paired telephone line, comprising:
    a first pair of frame buffers coupled to a receiving means, a transmitting means, and a codec wherein the receiving means comprises a second pair of frame buffers coupled to the first pair of frame buffers for placing samples received by the first pair of frame buffers; and
    means for decimating coupled between the first and second pairs of frame buffers for decimating two to one the samples received by the first pair of frame buffers.

13. The apparatus according to claim 12, wherein the size of the first and second pairs of frame buffers is 256 or 272 words.

14. The apparatus according to claim 12, wherein the size of the first and second pairs of frame buffers is 512 or 544 words.

15. The apparatus according to claim 12, wherein the size of the first pair of frame buffers is 512 words and the size of the second pair of frame buffer is 256 words.

16. The apparatus according to claim 12, wherein the transmitting means comprises an interpolator coupled to the first pair of frame buffers for interpolating samples to be transmitted by one to two.

17. The apparatus according to claim 12, wherein the size of the first pair of frame buffers is 544 words, and the size of the second pair of frame buffer is 272 words.

18. The apparatus according to claim 17, wherein the transmitting means comprises an interpolator coupled to the first pair of frame buffers for interpolating samples to be transmitted by one to two.

19. A method for achieving high speed data communication over a twisted paired telephone line, comprising the steps of:

employing a first pair of frame buffers to receive an input sample from a codec and to transmit an output sample to the codec wherein the receiving means comprises a second pair of frame buffers for storing the input sample received by the first pair of frame buffers; and changing the size of the first pair of frame buffers while a cyclic prefix is being added in output samples.

20. The method according to claim 19, wherein the cyclic prefix in the input samples is removed in the second pair of frame buffers before the size of the first pair of frame buffer is changed.

21. The method claim according to claim 19, wherein the cyclic prefix in the input samples is removed in the second pair of frame buffers after the size of the first pair of frame buffers is changed.

22. The method according to claim 21, wherein the input sample received by the first pair of frame buffers are decimated two to one and are then stored in the second pair of frame buffers.

23. The method according to claim 22, further comprising the steps of:

retrieving a first input sample from the codec;
swapping the first input sample and the output sample;
writing the output sample to the codec;
retrieving a second input sample from the codec; and
storing the first and second input samples.

* * * * *